United States Patent [19]

James et al.

[11] 3,857,072

[45] Dec. 24, 1974

[54] RELAY RELEASE TIMING CONTROL CIRCUIT

[75] Inventors: Dennis Bryan James, Rumson; James Royce McEowen, Holmdel Township, Monmouth County, both of N.J.

[73] Assignees: Bell Telephone Laboratories, Incorporated, Murray Hill; Bell Telephone Laboratories, Incorporated, Berkeley Heights, both of, N.J.

[22] Filed: Dec. 12, 1973

[21] Appl. No.: 426,649

[52] U.S. Cl. ............ 317/141 R, 179/99, 340/253 C

[51] Int. Cl. ............ H01h 47/18

[58] Field of Search ............ 317/141 R, 141 S; 307/235 R, 293, 141, 141.4; 340/253 B, 253 C, 256, 248 R, 248 B; 179/81 R, 99

[56] References Cited

UNITED STATES PATENTS 3,346,779 10/1967 Enk ............ 317/141 R 3,457,560 7/1969 McKinley ............ 307/235

OTHER PUBLICATIONS

Motorola – "Silicon Zener Diode and Rectifier Handbook", 2nd edi., 1964, p. 79.

*Primary Examiner*—J. D. Miller

*Assistant Examiner*—Harry E. Moose, Jr.

*Attorney, Agent, or Firm*—David H. Tannenbaum

[57] ABSTRACT

The release characteristics of a relay are controlled to within a small critical range by a circuit which insures that the relay will remain operated for a period of time to bridge valid open conditions with respect to operate current and will release if the open condition exceeds another fixed period. The critical range is approximately three hundred to six hundred milliseconds and is accomplished by an RC timing circuit in combination with two zener diodes, one of which is inserted in series with the relay winding. The first zener diode acts as a reference voltage for charging the capacitor while the second zener diode acts to move the release point of the relay high enough on the RC decay curve for accurate control. The circuit is arranged such that the timing capacitor does not interfere with the operate time of the relay and is further arranged to take advantage of available components having standard tolerances.

7 Claims, 5 Drawing Figures

Patented Dec. 24, 1974 3,857,072

2 Sheets-Sheet 2

RELAY RELEASE TIMING CONTROL CIRCUIT

FIELD OF THE INVENTION

This invention relates to telephone systems and, more particularly, to an arrangement for accurately controlling the release time of a relay.

BACKGROUND OF THE INVENTION

In many situations it is desired to release a relay for a certain fixed interval after its operate current has been removed. For example, when a relay is used to provide the hold function with respect to a central office line in a telephone system, it is often necessary to control precisely the release time of the relay to within certain finite periods. One problem that must be overcome with such a hold control relay arises from the fact that the hold function must be released under two divergent conditions; namely, (1) when the subscriber at the station returns from the hold condition and (2) when current stops flowing in the central office loop, i.e., open (or shorted) loop condition. However, in the latter case, under certain conditions the central office loop opens periodically at times when it is not desired to release the hold relay. Accordingly, the hold relay must be designed to span such intervals and to only release when the central office loop current has stopped flowing for a specific period of time.

One solution to this problem is to adjust the release time of the relay to span the central office open condition. However, this solution also causes problems in that the release of the hold condition is controlled by the release time of the hold relay and, thus, the hold release time is also delayed when the subscriber returns from the hold condition. Under such a condition, the subscriber, after reoperating the line pickup key, must wait a period of time before communication can be resumed on the held line. This is an undesirable condition.

Another solution to the problem is taught by the copending application of A. D. Limiero and J. P. Smith, Ser. No. 362,190, filed May 21, 1973. The Limiero-Smith teaching is directed to line circuit situations where logic circuitry is available for the switching of capacitors in and out of the circuit in order to change the release time of the hold bridge. In Limiero-Smith the hold bridge is controlled by transistors having very fine operate-release points and, thus, the Limiero-Smith solution is unavailable in situations where the current which is required to hold a relay operated ($I_{hold}$) is substantially higher than the release current ($I_{release}$) of the relay. Because of the wide range between hold and release currents of relays where the exact release point of the relay is unknown, any timing circuit based on a decaying voltage curve, such as an RC curve, is inherently inaccurate. Further compounding the problem is the fact that the release current of relays is typically low compared to the hold current and usually falls in that portion of the RC decay curve which approaches zero in a slow asymptotic manner.

Accordingly, a need exists in the art for a simplified hold bridge relay control circuit operable for precisely controlling the release time of a hold bridge relay while not interfering with the relay's operate characteristics.

A further need exists in the art for such a control circuit operable from line current and constructed from standard components having commonly available tolerances, and with the combination requiring very little space.

It is a general object of our invention to provide a hold bridge control circuit which achieves both of these needs in an economical manner while at the same time reducing the cost and size of such circuits.

SUMMARY OF THE INVENTION

In a copending application, J. R. McEowen, Ser. No. 426,648, filed concurrently herewith, there is disclosed an extremely simplified hold bridge relay circuit which meets all of the requirements imposed on small telephone multiline systems. In the instant application, in the embodiment shown, we have disclosed and provided a detailed discussion of a circuit operable for precisely controlling the release time of the hold bridge relay (relay 1B shown in the aforementioned J. R. McEowen application) to within certain well-defined limits so that the relay can bridge valid open conditions with respect to its operate current.

The hold bridge control circuit consists of a full wave rectifier polarity guard with a zener diode placed across the bridge to provide a stabilized reference voltage which charges a timing capacitor. The capacitor, in addition to its timing function, supplies the energy to maintain the hold relay closed for at least 300 milliseconds after operate current is interrupted.

A resistor is used to isolate the relay from the capacitor when the circuit is originally put on hold and is chosen to allow the relay to operate in less than 40 milliseconds after the hold button is operated. A second zener diode or varistor in series with the relay winding is used to move the relay release point from the flattened bottom portion of the RC decay curve to a higher and hence more sensitive place on the curve, thereby reducing the release time variation due to the large space between $I_{hold}$ and $I_{release}$ of the relay.

A series resistor included with the relay winding resistance effectively reduces the tolerance on the resistance of the relay winding from ten percent to approximately five percent by using a resistor equal in resistance to that of the relay but with one percent tolerance. The value of the series resistor is small so that the voltages $V_{hold}$ and $V_{release}$ across the relay-resistor combination (which correspond to $I_{hold}$ and $I_{release}$ of the relay) is small. However, as will be seen, this resistance must be chosen with care and must not have too small a value because the corresponding timing capacitance will then be excessively high.

In an alternate embodiment, a pair of transistors is used to control the relay release point by providing an alternate discharge path for the RC timing network.

Accordingly, it is a feature of our invention that a hold bridge relay is arranged with a circuit operable from line current for controlling its release time so that the relay will remain operated to span valid open line conditions.

It is another feature of our invention that there is provided such a circuit having standard components all of a passive nature.

It is still another feature of our invention that a hold bridge relay is arranged with a circuit which allows the relay to release quickly in the situation where a subscriber returns from a hold condition and to release only after a specific interval in situations where the central office loop current stops flowing.

DESCRIPTION OF THE DRAWING

The operation and utilization of the present invention will be more apparent from the following description of the drawing, in which.

DETAILED DESCRIPTION

Figure 1:
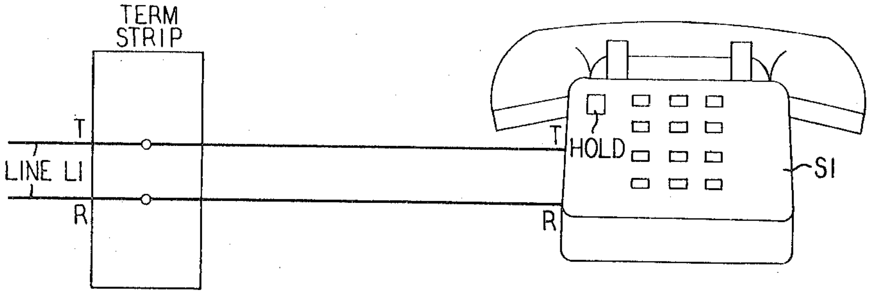
FIG. 1 shows a single station connected to a single line.

As shown in FIG. 1, a subscriber utilizing station S1 engaged in a communication connection over line L1 may place line L1 on hold by operating the hold key and replacing the handset on the switchhook while the hold key is operated.

Figure 2:
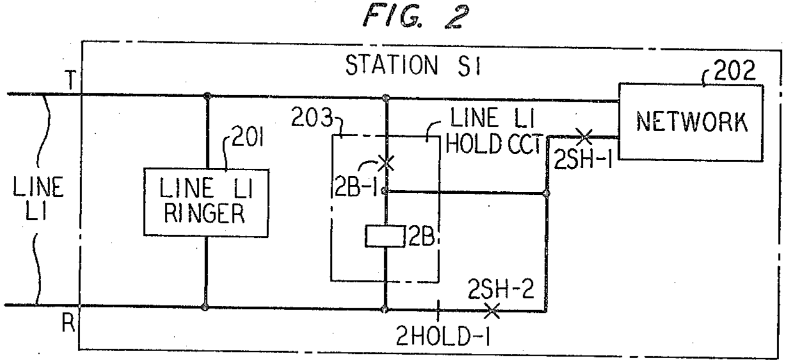
FIG. 2 is a schematic diagram showing the hold bridge relay without the control circuit.

In FIG. 2 there is shown the relay hold bridge circuitry arranged to accomplish the hold function. The operation of this circuitry is completely described in the aforementioned J. R. McEowen application and only a brief discussion will be included herein for the purpose of clarity. When network 202 is off-hook, line current flows from the T lead of line L1 to the network 202 and via enabled switchhook contacts 2SH–1 and 2SH–2 and released hold contact 2HOLD–1 back to the R lead of line L1. This is the standard communication configuration well known in the art.

The winding of relay 2B, which is the hold bridge relay, is shorted by a direct metallic short via enabled switchhook contact 2SH–2 and released hold contact 2HOLD–1. Accordingly, relay 2B remains unoperated when network 202 is connected to line L1 for communication purposes. When the subscriber at station S1 desires to enable the hold function, the hold key is operated, thereby removing the short from across the winding of relay 2B via now enabled hold contact 2HOLD–1. Accordingly, line current from the T lead flowing through network 202 and enabled switchhook contact 2SH–1 also flows through the winding of relay 2B to the R lead of line L1, thereby operating relay 2B.

When hold bridge relay 2B operates, a connection is completed from the T lead via enabled make contact 2B–1 through the winding of relay 2B to the R lead, thereby causing current to flow through the winding of relay 2B to maintain that relay operated. The impedance of the winding of relay 2B acts as a termination for line L1 so as to maintain loop current flowing and to hold the connection of line L1 even when the handset is replaced on the switchhook.

When the subscriber returns from the hold condition by removing the handset and operating the switchhook, relay 2B is again shorted via enabled make contact 2SH–2 and released break contact 2HOLD–1, thereby causing the hold bridge relay to release quickly by discharging capacitor 3C through resistors 3R3 and 3R4.

Hold bridge relay 2B must also release when the subscriber connection over line L1 is broken, which condition is signified by an open or shorted condition on the T and R leads. Since relay 2B is maintained operated from line current, this open condition will cause the hold bridge relay to release in a straightforward manner. However, as discussed previously, a certain condition occurs on line L1 which causes the line current to be momentarily interrupted for as long as 300 milliseconds, which condition does not signify a broken connection and, thus, hold bridge relay 2B must bridge such intervals to prevent premature release of the circuit. However, in order for the system to operate properly, relay 2B must be released before the expiration of 600 milliseconds.

Figure 3:
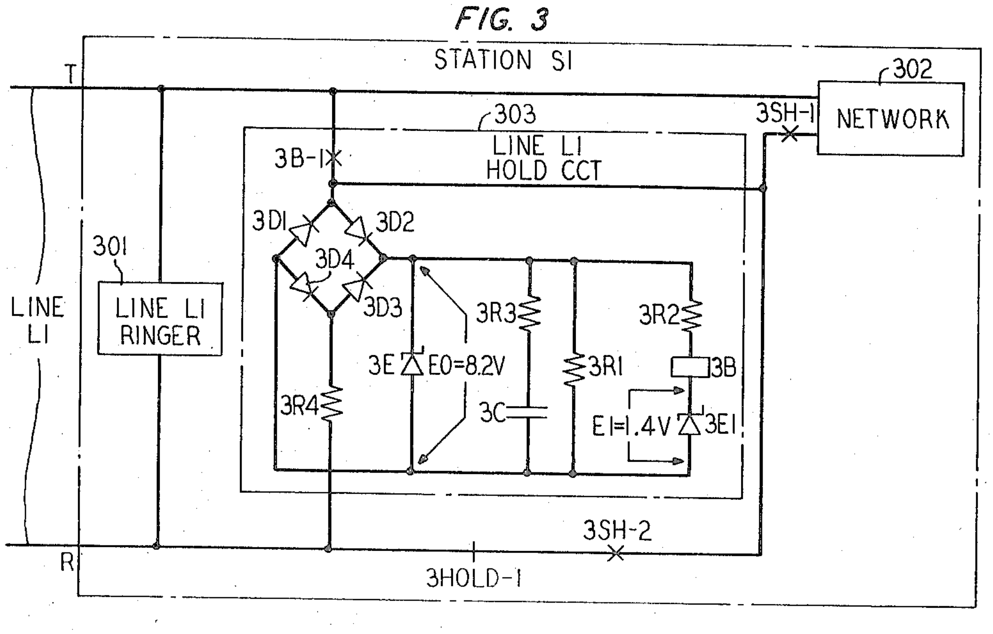
FIGS. 3 and 4 are schematic diagrams showing in detail the hold bridge relay control circuits.

In FIG. 3 circuitry is shown for controlling the release time of the hold bridge relay, which relay is designated 3B. This circuitry consists of a full wave rectifier polarity guard comprising diodes 3D1, 3D2, 3D3 and 3D4 and a resistor 3R4. Zener diode 3E is placed across the rectifier to provide a stabilized 8.2-volt level. When the 3HOLD–1 contact opens, the short across the line L1 hold circuit is removed, thereby establishing the 8.2-volt reference across capacitor 3C. The fact that resistor 3R3 is in series with capacitor 3C allows capacitor 3C to charge but also allows relay 3B to operate within 40 milliseconds. Zener diode 3E1 is selected to have a breakdown voltage much lower than 8.2 volts and, thus, conducts when the rectifier is activated.

Series resistor 3R2 included with the relay winding resistance is selected having a resistance value equal to the resistance value of the relay winding but with a 1 percent tolerance, thereby reducing the tolerance on the resistance of the relay winding from 10 percent to approximately 5 percent.

When current stops flowing on line L1, the voltage supplied by the rectifier is removed. However, since capacitor 3C is fully charged to that potential, energy is provided to maintain the relay operated for a period of time. Capacitor 3C begins to discharge with the discharge time being a function of the capacitance of capacitor 3C and the resistance of resistors 3R1, 3R2 and 3R3, plus the resistance of the winding of hold bridge relay 3B. This function is the well known RC decay curve which, as shown in FIG. 5, starts at the top at a voltage of 8.2 (reference voltage) and decays as a function of time to zero, approaching zero asymptotically.

Zener diode 3E1, which could also be a varistor, is selected to have a breakdown value of around 1.4 volts so that when the voltage supplied by the capacitor 3C is reduced to 1.4 volts the diode stops conducting and the relay releases. Thus, the relay release time becomes dependent upon the turnoff voltage of the zener diode and is relatively independent from its own release current.

Resistor 3R1 is provided so that when zener diode 3E1 turns off a discharge path remains for capacitor 3C. If this were not provided, then, as the voltage approached the zener diode cutoff voltage, the effective circuit resistance would become unpredictable and, thus, the relay release time would again become subject to uncertainty.

Figure 5:
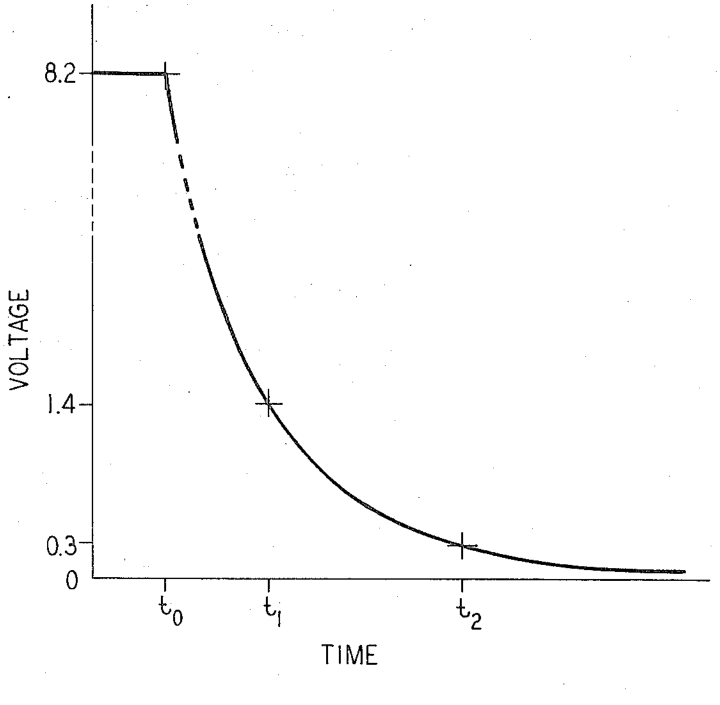
FIG. 5 shows a typical RC decay curve.

FIG. 5 shows a typical RC decaying exponential voltage curve where the reference voltage at the start of the decay (line open condition) at time $t_0$ is 8.2 volts. After the removal of line current, energy is supplied by capacitor 3C to produce the curve shown. The zener diode cutoff device opens the current path to the relay winding when the voltage is reduced below the 1.4-voltage level. This occurs at time $t_1$, which time corresponds to the delay interval that the relay must span before releasing. Once the elapsed time between $t_0$ and $t_1$ is chosen, it is a simple matter to select a zener diode having the proper cutoff point or to vary the resistance or capacitance of the circuit to provide the proper relay release point.

FIG. 5 also points out clearly the difficulty encountered when an RC decay curve is used to control the release time of the relay without also using the zener diode cutoff technique disclosed. For example, assume a relay having a hold voltage of 0.35 volt and a release voltage of 0.1 volt and keep in mind that between those two voltages an uncertainty exists as to the operate or release condition of the relay. Then, as shown on the RC decay curve, the relay will release at some point after time $t_2$ as controlled by the flattened part of the curve. Since the decay curve only slowly approaches the 0.1 volt release point of the relay, precise control is unavailable.

In order to choose the values of the components, a worst-case analysis will be performed using the following expression for $\tau_{max}$, the maximum allowable hold-over interval (600 milliseconds):

$$\tau_{max}=3C_{max}(3R3_{max}+R_{max})\ln\left(\frac{R_{max}}{3R3_{max}+R_{max}}\right)\cdot\frac{\left(E0_{max}-\frac{E1_{min}\cdot R_{max}}{3R2_{max}}\right)}{\left(V_{min}+\frac{E1_{min}\cdot R_{max}}{3R1_{max}}\right)} \quad (1)$$

where $$R_{max}=(3R1_{max}\cdot 3R2_{max})/(3R1_{max}+3R2_{max}),$$
$$V_{min}=V_{release}$$
$$V_{max}=V_{hold}. \quad (2)$$

The corresponding formula for $\tau_{min}$, the minimum allowable hold-over interval (300 milliseconds), is obtained from the above formula by substituting "max" for "min" and "min" for "max" throughout.

Using the following component values:

$3R1 = 2{,}200 \pm 1\%$
$3R2 = 250 \pm 1\%$ (resistor) $+ 250 \pm 10\%$ (relay) $= 500 \pm 5\%$
$3R3 = 100 \pm 5\%$
$EO = 8.2V \pm 5\%$
$E1 = 1.4V \pm 5\%$
$3C = 390\ \mu F \pm 10\%$ we find $\tau_{min}$ and $\tau_{max}$ to be within a few milliseconds of 300 milliseconds and 600 milliseconds, respectively, meeting the requirement that the relay must not be released for a line current break of less than 300 milliseconds but must be released on a line current break of at least 600 milliseconds.

In addition to the above components, we use a sealed reed single-contact relay wound with 7500 turns of 35-gauge wire having a resistance of 250Ω and having $$I_{operate} = 3.8\text{ ma}$$
$$I_{hold} = 1.3\text{ ma}$$
$$I_{release} = 0.4\text{ ma}$$

Figure 4:
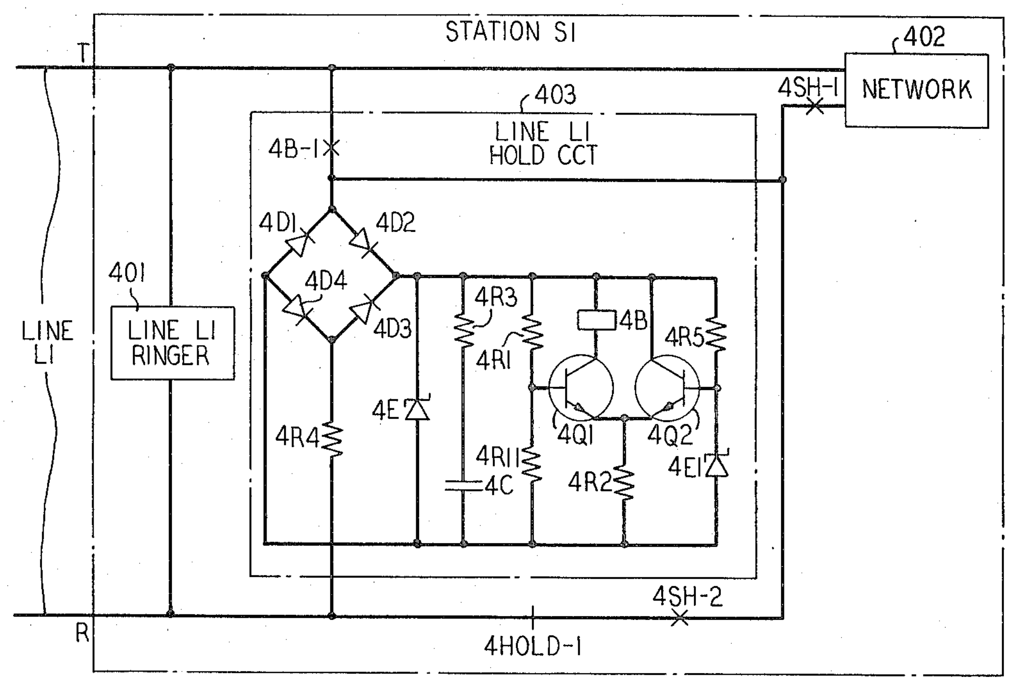

In FIG. 4 there is shown an alternate release arrangement using a pair of transistors 4Q1, 4Q2 in addition to the zener diode to effect the release of the hold bridge relay 4B. When voltage appears on zener diode 4E, transistor 4Q1 conducts, operating relay 4B, and transistor 4Q2 is biased off by the voltage across resistor 4R2. Basically, the circuit operates in the same manner as does the FIG. 3 circuit, except that when the voltage across resistor 4R11 falls to about the same voltage as that across zener diode 4E1 the voltage drop caused by the base emitter junction of transistor 4Q1 causes the voltage at the emitter of transistor 4Q2 to fall lower than the voltage provided by zener diode 4E1. Thus, the back bias from transistor 4Q2 is removed and that transistor is turned on providing a low impedance path via the collector of 4Q2 for discharging capacitor 4C. In this situation the effective decay curve resistance is the combined resistances of resistors 4R1, 4R11 and 4R5, and the winding of the hold relay. The FIG. 4 circuit has less severe tolerance restrictions than does the circuit of FIG. 3 but at the penalty of the addition of active devices.

CONCLUSION

Although specific values have been shown for the various circuit elements and specific voltages have been shown for operation, it should be understood that these are for illustrative purposes only and the values chosen are based upon the analysis provided above. Numerous other combinations will also work, dependent only on the desired circuit operation.

Also, it should be immediately obvious that this circuit is not limited to use in hold bridge control situations but rather may find widespread applicability wherever relay release times are critical.

Another embodiment of this invention utilizes a transistor connected in series with the relay winding to provide gain between the dual reference timing circuit and the relay. In this configuration the capacitor need not contain energy to hold the relay operated throughout the timing interval but contains only sufficient energy to maintain the transistor operated.

What is claimed is:

1. A circuit for controlling the release time of a relay in a manner such that the relay releases only after operate current provided over a pair of leads has been removed for a fixed interval, said circuit comprising:

means concurrently connected across said pair of leads and across said relay for establishing a first fixed reference voltage level derived from said current flowing between said pair of leads, said reference level voltage serving to maintain said relay operated;

means concurrently connected across said reference voltage means and across said relay operable upon the removal of said line current for reducing the magnitude of said fixed reference in an RC decaying exponential manner, where R is the effective resistance of the circuit and C is the effective capacitance of the circuit; and means connected in series with the winding of said relay operable for passing current therethrough and through said relay winding only when said voltage is greater than a second fixed level, said second fixed level having a magnitude such that when said line current is removed said decaying value of said reference voltage does not reach said second fixed level until the expiration of said fixed interval, thereby maintaining said relay operated after said removal of said line current for a period of time determined by said reference voltage being reduced to said second fixed level.

2. The invention set forth in claim 1 wherein said series connected means is a breakdown device having a well-defined fixed voltage breakdown level whereby, above said level, current will flow therethrough and, below said level, current will not flow.

3. The invention set forth in claim 2 wherein said device is a zener diode.

4. The invention set forth in claim 2 wherein said device is a first transistor, the emitter thereof connected to the emitter of a second transistor, and said second transistor arranged such that when said first transistor stops passing current said second transistor begins to bypass current around said winding of said relay.

5. A relay control circuit comprising means for maintaining said relay operated when operate current over a pair of leads is interrupted for a period of time less than a first fixed interval and for insuring that said relay releases when said operate current over said pair of leads is interrupted longer than said first fixed interval but prior to a second fixed interval, said means comprising:

breakdown means having a well-defined voltage level above which current flows through said device and below which current will not flow therethrough, said breakdown means in series with said relay winding, said breakdown means and said relay winding forming a series network;

means concurrently connected to said pair of leads and to said series network for establishing a fixed reference voltage across said series network for maintaining said relay operated, said reference voltage being generated from said operate current;

a timing capacitor concurrently connected in parallel with said series network and with said fixed reference voltage means;

a resistor connected in parallel with said series network;

means responsive to the interruption of said operate current for generating an RC decaying curve of said reference voltage formed by said capacitor and the circuit resistance, said resistor having a value to adjust said RC decaying curve so that a rapidly decaying voltage portion thereof falls between said first and second intervals, and wherein said well-defined voltage level of said breakdown device is such that said decaying reference voltage reaches said level between first and second fixed intervals.

6. The invention set forth in claim 5 wherein said device is a zener diode.

7. The invention set forth in claim 5 wherein said device is a first transistor, the emitter thereof connected to the emitter of a second transistor, and said second transistor arranged such that when said first transistor stops passing current said second transistor begins to bypass current around said winding of said relay.

* * * * *